(12) United States Patent
Ou

(10) Patent No.: US 9,481,100 B2
(45) Date of Patent: Nov. 1, 2016

(54) CONTINUOUS-TYPE AUTOMATIC LABEL SEPARATING APPARATUS

(71) Applicant: ZHEJIANG BORETECH CO., LTD., Pinghu, Zhejiang Province (CN)

(72) Inventor: Che-Wen Ou, Pinghu (CN)

(73) Assignee: ZHEJIANG BORETECH CO., LTD., Pinghu, Zhejiang Province (CN)

( * ) Notice: Subject to any disclaimer, the term of this patent is extended or adjusted under 35 U.S.C. 154(b) by 323 days.

(21) Appl. No.: 14/447,386

(22) Filed: Jul. 30, 2014

(65) Prior Publication Data
US 2015/0033927 A1  Feb. 5, 2015

(30) Foreign Application Priority Data

Jul. 30, 2013  (CN) .......................... 2013 1 0324413

(51) Int. Cl.

| B02C 18/14 | (2006.01) |
|---|---|
| B26D 1/00 | (2006.01) |
| B29B 17/02 | (2006.01) |
| B26D 1/25 | (2006.01) |
| B29L 31/00 | (2006.01) |

(52) U.S. Cl.
CPC ............ B26D 1/0006 (2013.01); B02C 18/14 (2013.01); B26D 1/25 (2013.01); B29B 17/02 (2013.01); *B26D 2001/006* (2013.01); *B26D 2001/0033* (2013.01); *B29B 2017/0217* (2013.01); *B29L 2031/7158* (2013.01); *B29L 2031/744* (2013.01); *Y02W 30/622* (2015.05); *Y10T 83/9382* (2015.04)

(58) Field of Classification Search
CPC .... B02C 18/14; B02C 19/00; B02C 19/0056

USPC ..................................... 241/286, 259.1, 260
See application file for complete search history.

(56) References Cited

U.S. PATENT DOCUMENTS

| 4,013,497 A | * | 3/1977 | Wolf ....................... B08B 9/083 |
|---|---|---|---|
| | | | 15/59 |
| 8,479,797 B1 | * | 7/2013 | Hurst ...................... B08B 9/083 |
| | | | 156/717 |
| 2013/0146105 A1 | * | 6/2013 | Kirchhoff ................. B08B 7/00 |
| | | | 134/32 |

FOREIGN PATENT DOCUMENTS

| CN | 202029274 U | * | 11/2011 | ............. B29B 17/02 |
|---|---|---|---|---|
| JP | 3581337 | * | 7/2004 | ............. B29B 17/02 |

\* cited by examiner

*Primary Examiner* — Mark Rosenbaum
(74) *Attorney, Agent, or Firm* — Muncy, Geissler, Olds & Lowe, P.C.

(57) ABSTRACT

A continuous-type automatic label separating apparatus is formed of a frame, a driving device, and a label separating device. The frame includes a feeding port and a discharging port. The driving device is mounted to one side of the label separation device. The label separation device is formed of a rotary shaft, a combination-type cutter unit, and an adjustable nail unit. The combination-type cutter unit is installed to the rotary shaft. The adjustable nail unit surrounds the combination-type cutter unit. A label-separation interval is formed between the combination-type cutter unit and the adjustable nail unit. The combination-type cutter unit includes a circular or polygonal cross-section. The adjustable nail unit includes label separating bolts. Each of the label separating bolts includes an adjustable fixed needle. The adjustable nail unit also includes a slide rail formed of concavities and convexities opposite to the concavities.

5 Claims, 3 Drawing Sheets

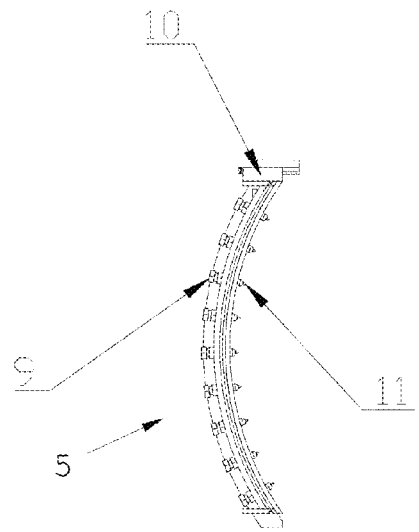
FIG. 3
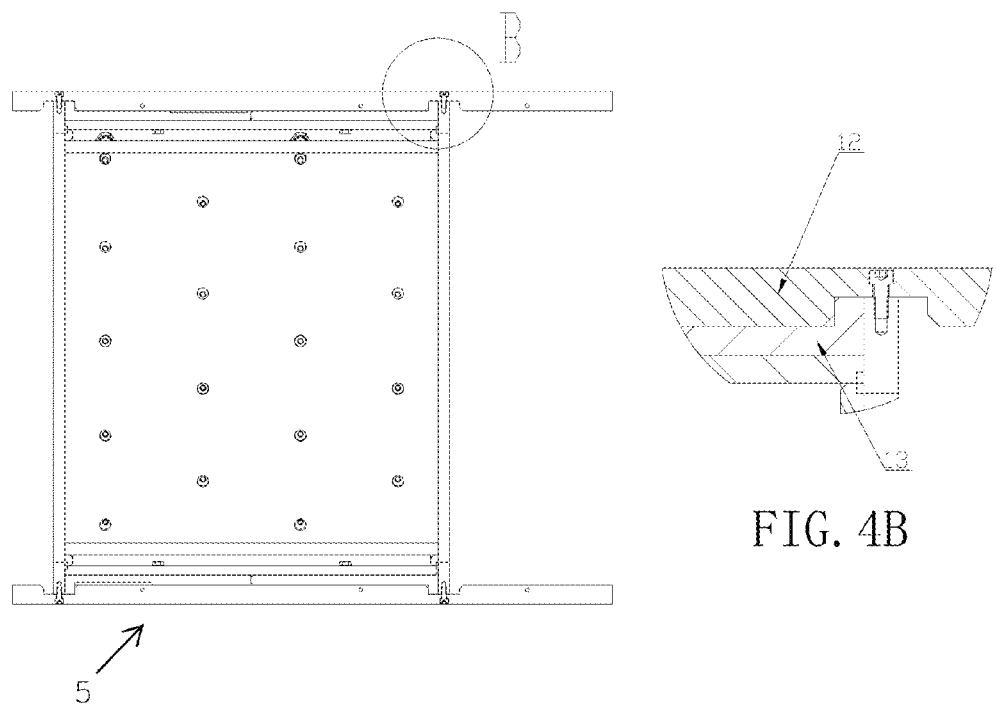
FIG. 4A
FIG. 4B

CONTINUOUS-TYPE AUTOMATIC LABEL SEPARATING APPARATUS

CROSS REFERENCE TO RELATED APPLICATIONS

This application claims priority of Application No. 201310324413.0 filed in China on Jul. 30, 2013 under 35 U.S.C. §119, the entire contents of all of which are hereby incorporated by reference.

BACKGROUND OF THE INVENTION

1. Field of the Invention

The present invention relates generally to a recycling device of labels attached to dumped bottles and more particularly, to a continuous-type automatic label separating apparatus.

2. Description of the Related Art

Conventionally, after dumped plastic bottles or dumped plastic plates are recycled, the steps of label separation, sorting, cleaning, crushing, and drying will be applied to them and finally they become reusable raw materials. However, the structural design of the conventional label separator is not good enough because the space for the label separation cannot be adjusted, the efficiency of the label separation is low, and it is not applicable to every size and type of the plastic bottle and the bottle label to be highly limited.

SUMMARY OF THE INVENTION

The primary objective of the present invention is to provide a continuous-type automatic label separating apparatus, which can improve the aforesaid drawbacks of the conventional label separator.

The foregoing objective of the present invention is attained by the continuous-type automatic label separating apparatus formed of a frame, a driving device, and a label separating device. The frame includes a feeding port and a discharging port formed at an upper side thereof and a lower side thereof, respectively. The driving device is mounted to one side of the label separation device. The label separation device is formed of a rotary shaft, a combination-type cutter unit, and an adjustable nail unit. The combination-type cutter unit is installed to the rotary shaft. The adjustable nail unit surrounds the combination-type cutter unit. A label-separation interval is formed between the combination-type cutter unit and the adjustable nail unit. The cross-section of the combination-type cutter unit is circular or polygonal. The adjustable nail unit includes label separating bolts. Each of the label separating bolts is provided with an adjustable fixed needle. The adjustable nail unit also includes a slide rail formed of concavities and convexities opposite to the concavities.

The advantages of the present invention lie in that the position and angle of the bottle or the label on the plastic bottle can be changed in the process of label separation by means of the circular or polygonal (e.g. hexagonal or octagonal) cross-section of the combination-type cutter unit and diversified structure of blades of the combination-type cutter unit to further increase the efficiency of the label separation and decrease the damage to the bottle.

The adjustable nail unit is provided with the slide rail formed of the concavities and the convexities and the concavities engage the convexities, so it is convenient to assemble and disassemble the adjustable nail unit and it is easy to replace and repair the continuous-type automatic label separating apparatus. The structure of the slide rail leads to upward and downward movement to adjust the distance between the combination-type nail unit and the rotary shaft very swiftly and conveniently. In addition, the fixed needles of the label separating bolts can also adjust the label-separation interval. The adjustable nail unit and the label separating bolts can jointly lead to the preferred label-separation interval.

With the coordination of the polygonal combination-type cutter unit, the diversified structure of the blade, and the fixed needles, full friction and angle change can be applied to the plastic bottles and the labels on the bottles within the space of label separation for the purpose of multi-directional label separation.

BRIEF DESCRIPTION OF THE DRAWINGS

FIG. 3 is a schematic view of a part of the adjustable nail unit of the preferred embodiment of the present invention.

FIG. 4A is a schematic view of the preferred embodiment of the present invention, illustrating the combination-type cutter unit.

FIG. 4B is an enlarged view of the part B indicated in FIG. 4A.

DETAILED DESCRIPTION OF PREFERRED EMBODIMENTS

Structural features and desired effects of the present invention will become more fully understood by reference to preferred embodiments given hereunder. However, it is to be understood that these embodiments are given by way of illustration only, thus being not limitative of the claim scope of the present invention.

Figure 1:
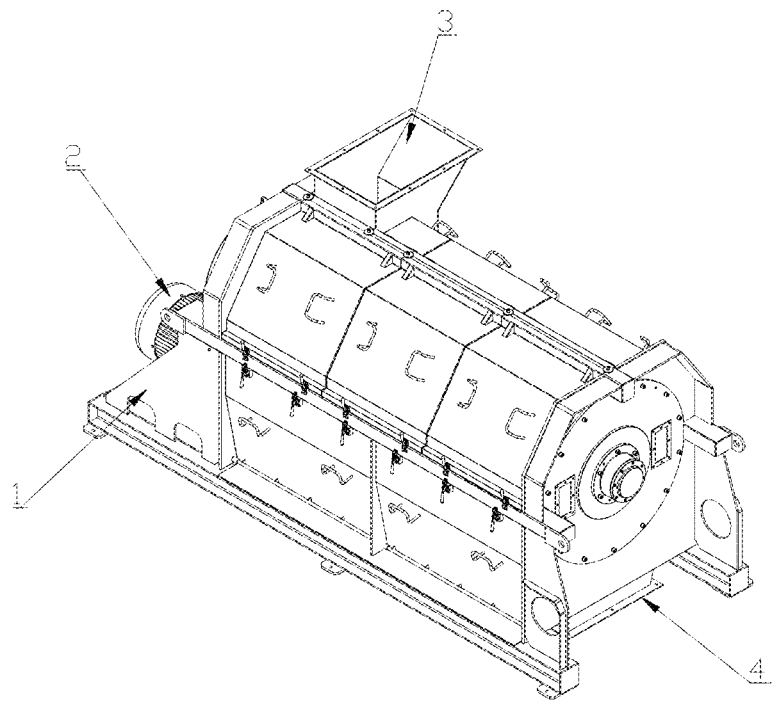
FIG. 1 is a perspective view of a preferred embodiment of the present invention.

Referring to FIG. 1, a continuous-type automatic label separating apparatus is formed of a frame 1, a driving device 2, and a label separating device. The frame includes a feeding port 3 formed on an upper side thereof and a discharging port 4 formed at a lower side thereof. The driving device 2 is mounted to one side of the label separating device.

Figure 2:
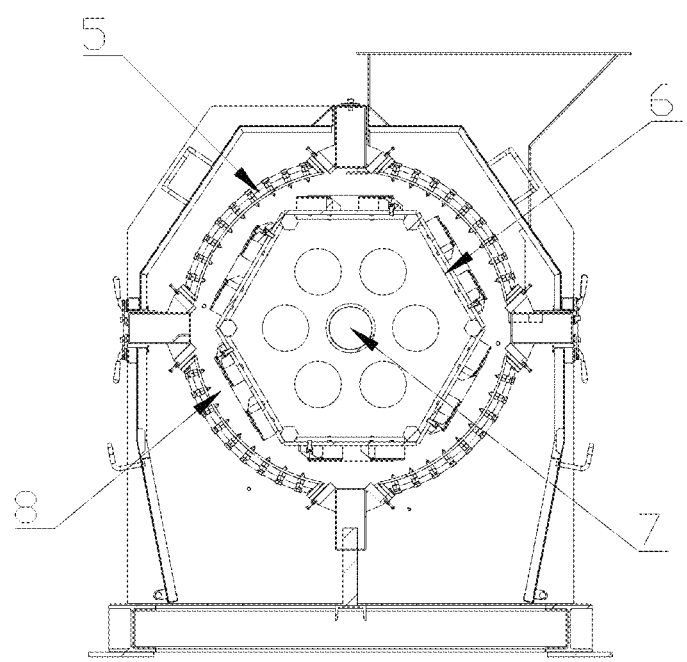
FIG. 2 is a sectional view of the preferred embodiment of the present invention.

Referring to FIG. 2, the label separating device is formed of a rotary shaft 7, a combination-type cutter unit 6, and an adjustable nail unit 5. The combination-type cutter unit 6 is installed to the rotary shaft 7. The adjustable nail unit 5 surrounds the combination-type cutter unit 6. A label-separation interval is formed between the combination-type cutter unit 6 and the adjustable nail unit 5. The adjustable nail unit 5 includes a circular or polygonal cross-section. The polygonal cross-section of the adjustable nail unit 5 can range from triangular one to icosagonal one and preferably range from hexagonal one to decagonal one. In this embodiment, FIG. 2 illustrates the hexagonal cross-section of the combination-type cutter unit 6.

Referring to FIG. 3, the adjustable nail unit 5 includes label-separating bolts 9 penetrating outward through an external surface and an internal surface thereof. Each of the label separating bolts 9 is provided with a fixed needle 11 at a front end thereof. The fixed needles 11 are adjustable to change the label-separation interval to make a variety of plastic bottles match.

Referring to FIGS. 4A and 4B, the adjustable nail unit 5 includes a slide rail 10 formed of concavities 13 and convexities 12 opposite to the concavities 13. The concavities 13 engage the convexities 12 to allow upward and downward movement to further change the distance between the adjustable nail 5 unit and the rotary shaft 7 swiftly and conveniently. The coordination between the fixed needles 11 and the slide rail 10 leads to the preferable label-separation interval for preferable efficiency of label separation.

Figure 5:
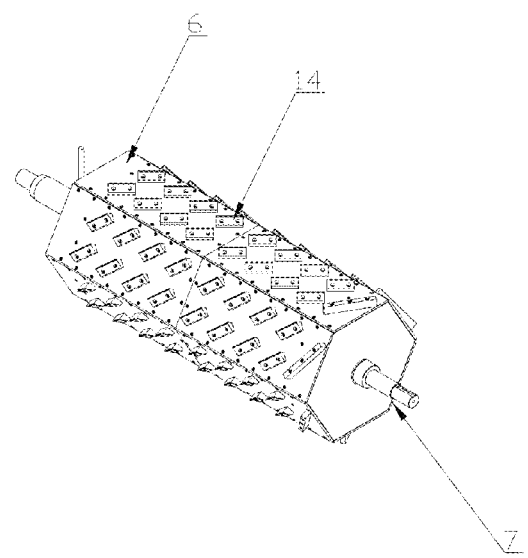
FIG. 5 is a schematic perspective view of the combination-type cutter unit of the preferred embodiment of the present invention.

Referring to FIG. 5, the combination-type cutter unit 6 includes monolithic cutter holders 14 having blades. The monolithic cutter holders 14 are arranged on the combination-type cutter unit 6 according to multi-angle and diversified permutation and combination of the blades.

Figure 6A:
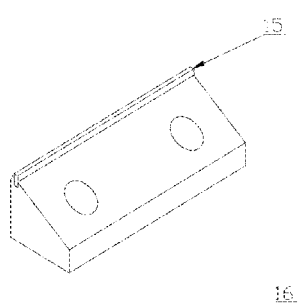
FIGS. 6A-6C are schematic views of the preferred embodiment of the present invention, illustrating a variety of the blades.
Figure 6B:
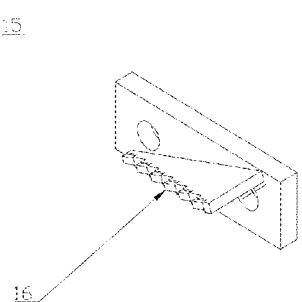
Figure 6C:
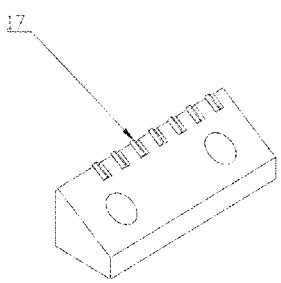

Referring to FIGS. 6A to 6C, the blades are customized tungsten-steel blades 15, or trapezoid blades 16, or toothed blades 17.

The polygonal combination-type cutter unit 6, the diversified blades, and the fixed needles 11 coordinate with one another, so full friction and angle change can be applied to the plastic bottles and the labels on the bottles within the label-separation interval 8 for the purpose of multi-directional label separation.

What is claimed is:

1. A continuous-type automatic label separating apparatus comprising a frame, a driving device, and a label separating device, the frame having a feeding port formed at an upper side thereof and a discharging port formed at a lower side thereof, the driving device being mounted to a side of the label separating device, the label separating device having a rotary shaft, a combination-type cutter unit, and an adjustable nail unit, the combination-type cutter unit being mounted to the rotary shaft, the adjustable nail unit surrounding the combination-type cutter unit, whereby a label-separation interval is formed between the combination-type cutter unit and the adjustable nail unit;

wherein continuous-type automatic label separating apparatus is characterized in that the combination-type cutter unit comprises a circular or polygonal cross-section and the adjustable nail unit comprises label separating bolts and a slide rail formed of concavities and convexities opposite to the concavities at upper and lower ends thereof, each of the label separating bolts having an adjustable fixed needle at a front end thereof.

2. The continuous-type automatic label separating apparatus as defined in claim 1, being characterized in that the polygonal cross-section ranges from triangular one to icosagonal one.

3. The continuous-type automatic label separating apparatus as defined in claim 1, being characterized in that the combination-type cutter unit comprises monolithic cutter holders having blades, the monolithic cutter holders being arranged on the combination-type cutter unit according to multi-angle and diversified permutation and combination of the blades.

4. The continuous-type automatic label separating apparatus as defined in claim 3, being characterized in that the blades are customized tungsten-steel blades, or trapezoid blades, or toothed blades.

5. The continuous-type automatic label separating apparatus as defined in claim 1, being characterized in that the label separating bolts penetrate outward through an external surface and an internal surface of the adjustable nail unit.

\* \* \* \* \*